United States Patent Office 3,348,313
Patented Oct. 24, 1967

3,348,313
DEVICE FOR DETECTING SURFACE ELE-
VATIONS IN SHEET MATERIAL
Laszlo Urmenyi, 18 Ernle Road, Wimbledon,
London SW. 20, England
Filed Sept. 16, 1964, Ser. No. 397,040
1 Claim. (Cl. 33—148)

The invention refers to a device for detecting wrinkles and other surface elevations in sheet material, e.g., paper or plastics. The device according to the invention contains at least one feeler member which may be a roll or a flap adapted to ride on an idler roll or other datum surface so that the sheet material may pass between the said feeler member and the said datum surface whereby the distance between the said datum surface and the feeler member is determined by the thickness of the said sheet material and any surface elevation on the sheet material will temporarily increase such distance, the said feeler member also comprising part of an electrically reactive circuit element the other part of the said circuit element being the datum member, the reactance of the said circuit element being a function of the distance between the said feeler member and the said datum member, also comprising a device adapted to give a signal when the said reactance differs from a predetermined value.

The said circuit element may consist of one or more coils preferably wound on a magnetic core and mounted on the feeler member in such a way that when the feeler member is in the operating position the magnetic flux is closed via the datum member. Thus the datum member itself becomes part of the reactive circuit element. Any change in the distance between the datum member and the feeler member alters the self inductance of the coil or coils or the mutual inductance between coils.

Alternatively the said circuit element may consist of the capacitance between two electrodes of which one is mounted on or is part of the feeler member and the other is the datum member. When the feeler member is in the operating position the said first electrode is positioned near the said datum member. Thus the datum member becomes part of the reactive circuit element. Any change in the distance between the feeler member and the datum member alters the capacitance between them.

The feeler members must contact the sheet material across the whole of the inspected width. When inspecting wide material, it is essential that more than one feeler member is used. In this case the feeler members may be staggered to ensure that no uninspected portion of the sheet material may pass between the feeler members.

Preferably, an even number of feeler members is used in pairs and the reactances in each pair are balanced against each other. Alternatively, the reactances may form part of a suitable circuit, e.g., a bridge circuit, which is adapted to produce a signal when the reactances are different from predetermined values.

An important feature of the invention is the fact that the said reactances depend only on the distance between the feeler members and the datum surface and not on the distance between the feeler members and any other member rigidly fixed to the same framework on which the feeler members are mounted, due to the fact that the datum member itself forms part of the side reactances and the feeler members actually ride on the datum surface, which latter is preferably an idler roll. Eccentric running of the idler roll therefore does not effect the said reactances and does not give a false signal.

The invention will now be described by the way of examples with reference to the drawings in which FIG. 1 shows the arrangement of rolls and probes in elevation.

Figure 1:
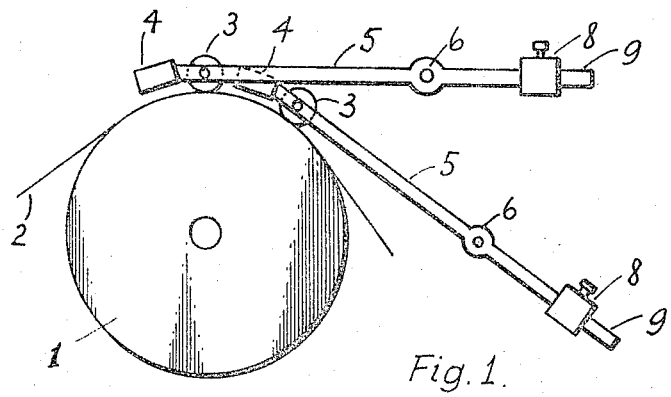
Figure 2:
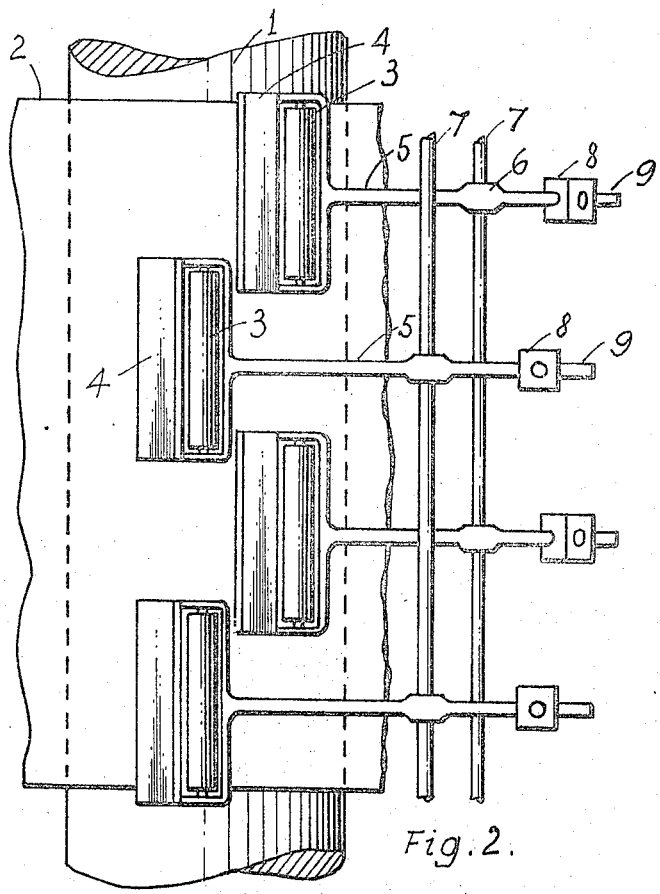
FIG. 2 is a plan view of FIG. 1.

Referring now to FIGURES 1 and 2, 1 is an idler roll, 2 is the sheet material to be inspected. 5 are arms on which rolls 3 and probes 4 are mounted, 6 are bearings on which arms 5 are pivoted. 7 are bars carrying the bearings 6, 9 are further arms carrying adjustable balancing weights 8. In operation when a surface elevation is passing between idler roll 1 and one of the rolls 3, the roll 3 and with it probe 4 is lifted up, thereby increasing the distance between the surface of idler roll 1 and probe 4 and changing the reactance of the circuit element mounted in probe 4. A suitable instrument, not shown, may be adapted to produce an electrical signal output when the said reactance changes or when the reactances of two circuit elements placed in two probes becomes unequal.

Figure 3:
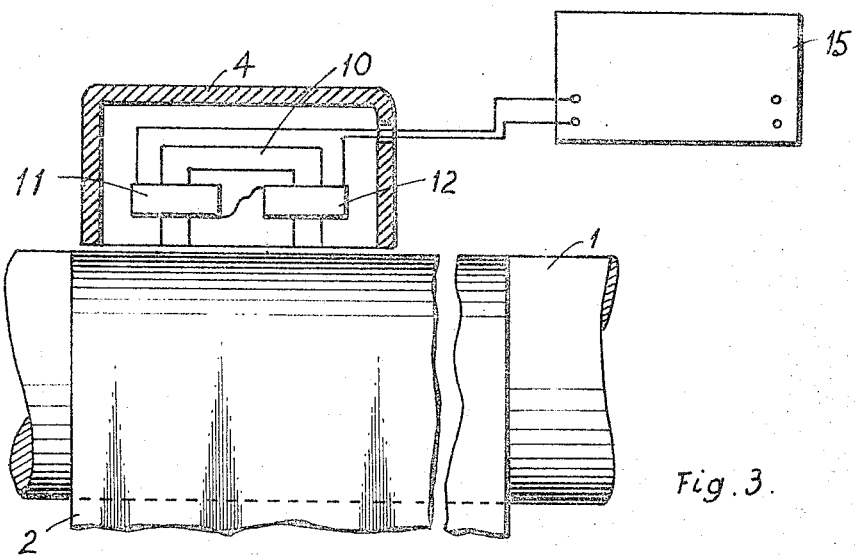
FIG. 3 shows the side view of a probe containing a U core and coils.

FIGURE 3 shows a probe 4 containing a U shaped core 10 on which coils 11 and 12 are wound. The coils 11 and 12 may be connected in series forming one single inductance which is measured in an AC bridge circuit or compared with a similar inductance in another probe. Or coil 11 may carry AC and the voltage induced in coil 12 may be measured or compared with a voltage induced in a similar coil in another probe. Coil 12 may contain two separate windings which may be interconnected with two windings of a similar coil 12 in another probe.

Figure 4:
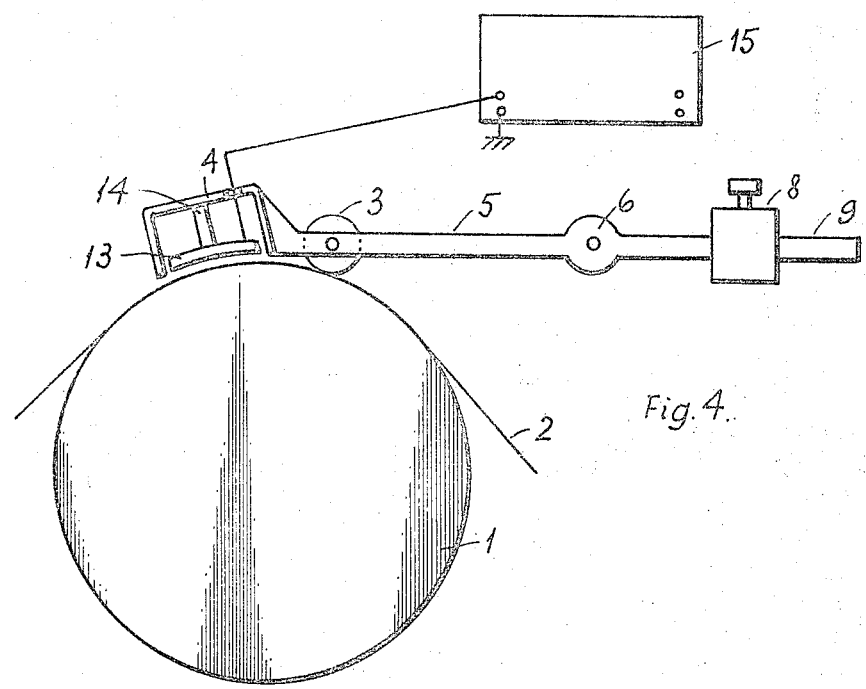
FIG. 4 shows the front view of a probe containing a capacitor plate.

FIGURE 4 shows a probe 4 containing a condenser plate 13 mounted on an insulator 14. The capacitance between plate 13 and idler roll 1 changes with change of distance and this capacitance may be measured or compared with a capacitance.

The electrical signal output of the said instrument may be utilised in various ways. It may be used to give a visible or audible alarm signal, to mark the edge of the paper or insert a tag. It may initiate automatic sorting. In the latter case the device would be used in conjunction with a cutter-sorter provided with an electrically or pneumatically operated gate. A suitable instrument could be utilised to provide the necessary time delay between the signal and the operation of the gate.

It will be appreciated that numerous alterations may be made to the above examples without departing from the invention. E.g., instead of resting the probes on an idler roll, they may be mounted to ride on a calender or on a stationary roll or any other datum surface. Further, in the example of FIG. 4 instead of providing a separate plate 13, the roll 3 (see FIGS. 1 and 2) may be insulated from its housing and the capacitance between roll 3 and idler roll 1 may be utilised in a suitable circuit to provide a signal when the capacitance changes. Provision may be made in any of the above examples in a way well known in the art to obtain a signal only when the probe is lifted by a surface elevation in the paper to be inspected causing a decrease in the reactance, but no signal is obtained when the probe returns to a less elevated position. If inductive circuit elements are used in a H.F. circuit, then the magnetic cores may be omitted. In this case the change of inductance due to change in distance between circuit element and datum member may be utilised to alter the resonance frequency of a tuned circuit or in any other way well known in the art.

What I claim is:

Device for detecting wrinkles, lumps and other surface elevations in paper and other sheet material containing at least two feeler members adapted to contact the sheet material across the whole of the inspected width and adapted to ride on a datum surface of a datum member in such a way that the sheet material to be tested can pass between the said feeler members and the said datum surface whereby the distance between the said datum surface and the said feeler members is determined by the thickness of the said sheet material and any surface elevation on the sheet material will temporarily increase such distance, the said feeler members being mounted staggered so that the portions of the sheet material inspected by each individual feeler member are overlapping, each of the said feeler members also comprising part of an electrically reactive circuit element the other part of the said circuit element being the said datum member, the reactance of the said circuit element being a function of the distance between the said feeler member and the said datum member, also comprising a device adapted to give a signal output when the said reactance differs from a predetermined value.

References Cited

UNITED STATES PATENTS

| | | | |
|---|---|---|---|
| 1,880,802 | 10/1932 | Chilson | 33—148 |
| 1,925,904 | 9/1933 | Mayne | 33—148 |
| 2,730,807 | 1/1956 | Collins | 33—148 |
| 2,870,403 | 1/1959 | Lippke | 324—61 |
| 2,932,089 | 4/1960 | Dexter et al. | 33—147 |
| 3,000,101 | 9/1961 | Giardino et al. | 33—148 |
| 3,065,415 | 11/1962 | Slamar | 33—147 |

LEONARD FORMAN, *Primary Examiner.*

W. D. MARTIN, *Assistant Examiner.*